United States Patent [19]

Cines et al.

[11] 4,066,538

[45] Jan. 3, 1978

[54] WATER PURIFICATION BY TREATING WITH ACTIVATED CARBON BEFORE BIOCHEMICAL TREATMENT

[75] Inventors: Martin R. Cines; Ben B. Buchanan, both of Bartlesville, Okla.

[73] Assignee: Phillips Petroleum Company, Bartlesville, Okla.

[21] Appl. No.: 434,006

[22] Filed: Jan. 17, 1974

[51] Int. Cl.² .............................................. C02C 1/06
[52] U.S. Cl. ......................................... 210/15; 210/18; 210/40; 210/73 R
[58] Field of Search ......................... 210/2–9, 210/15, 17, 18, 39, 40, 73 R

[56] References Cited

U.S. PATENT DOCUMENTS

| | | | |
|---|---|---|---|
| 3,455,820 | 7/1969 | Joyce et al. | 210/40 |
| 3,646,239 | 2/1972 | Hutson, Jr. et al. | 210/15 |
| 3,658,697 | 4/1972 | Huether | 210/40 |
| 3,767,570 | 10/1973 | Clapp | 210/40 |
| 3,779,909 | 12/1973 | Wisfeld et al. | 210/40 |

Primary Examiner—Thomas G. Wyse
Assistant Examiner—Peter A. Hruskoci

[57] ABSTRACT

Waste water having a high chemical oxygen demand caused primarily by soluble organic matter is treated with activated carbon and thereafter passed to a biochemical treating operation.

11 Claims, 1 Drawing Figure

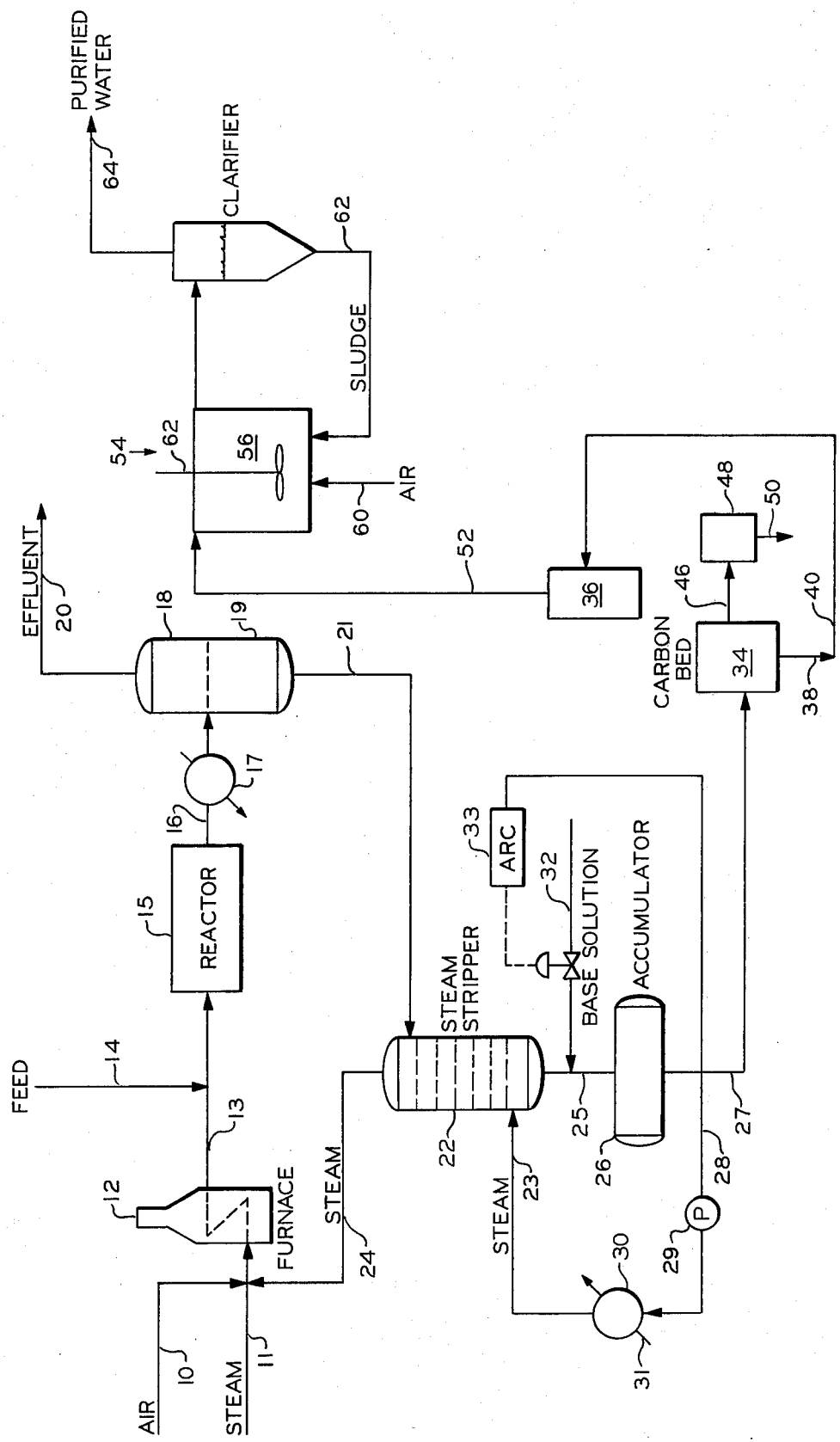

WATER PURIFICATION BY TREATING WITH ACTIVATED CARBON BEFORE BIOCHEMICAL TREATMENT

BACKGROUND OF THE INVENTION

This invention relates to a process for treating waste water having a relatively high chemical oxygen demand caused by organic material which is predominantly soluble in water. It is well known in the art to use a biochemical treatment step followed by carbon absorption in the treating of municipal sewage. Use of biochemical treatment is also known for waste water from chemical plants as evidenced by Hudson, Jr. et al, U.S. Pat. No. 3,646,239.

Waste water from chemical plants generally differs substantially from municipal sewage in that it contains a higher concentration of organic matter and in addition, this organic matter is predominantly soluble whereas in municipal sewage the organic matter is predominantly solids. The high concentration of organic matter having a chemical oxygen demand in waste water from chemical processes makes the treatment of this water extremely difficult. For instance, in a municipal sewer plant, chemical oxygen demand may be no more than 300 to 400 milligrams per liter and a 90 percent reduction leaves the effluent within generally accepted standards whereas with waste water from a chemical plant which may have a chemical oxygen demand of 2500 or more, a 90 percent reduction leaves the effluent still unsuitable for disposal.

BRIEF SUMMARY OF THE INVENTION

It is an object of this invention to provide a process suitable for treating water having a high chemical oxygen demand; it is yet a further object of this invention to provide a process for treating waste water having a high chemical oxygen demand wherein this demand is generated by organic material which is predominantly soluble; it is yet a further object of this invention to provide a process for treating waste water involving the use of activated carbon which makes efficient use of the carbon; and it is still yet a further object of this invention to provide an economical process for treating the waste water from an oxidative dehydrogenation process.

In accordance with this invention waste water is treated by contact with activated carbon followed by a biochemical treatment. This results in a greatly reduced consumption of activated carbon, and gives an effluent having a low COD.

BRIEF DESCRIPTION OF THE DRAWING

The drawing is a schematic representation of a waste water treatment process in accordance with this invention.

DESCRIPTION OF THE PREFERRED EMBODIMENT

As used herein, the term COD (chemical oxygen demand) is a measure of the oxygen equivalent of that portion of the organic matter in a sample that is susceptible to oxidation by a strong chemical oxidant. It can be expressed either in terms of milligrams per liter or in parts per million. Tests can be run in accordance with Standard Methods for the Examination of Water and Wastewater, 13th Edition, pages 495–499, American Public Health Association Inc. (1971). BOD (biochemical oxygen demand) is a similar test measuring the oxygen requirements for a biochemical oxidation of organic matter in waste water. This is run in accordance with "Standard Methods for the Examination of Water and Wastewater," 13th Edition, pages 489–495, Am. Public Health Assn. Inc., New York, New York (1960).

To meet current Federal specifications, waste water must have a maximum COD of 200 milligrams per liter and a maximum BOD of 20 milligrams per liter before the water can be discharged into a river or a pond.

The invention is applicable to the treatment of any waste water having a relatively high COD and a relatively high percentage of the COD produced by soluble organic material. The invention is particularly applicable to waste water having a COD of 1000 or greater, preferably 2000 to 10,000 milligrams per liter. It is of particular applicability to such waste water wherein the COD is produced by organic material which is greater than 50 percent, preferably greater than 90 percent soluble. It is of particular applicability to waste water having 90 to 99 percent of the material creating the COD in the form of soluble organic matter.

The invention is of primary applicability in treating waste water from chemical plants and most particularly applicable to the purification of effluents from oxidative dehydrogenation processes.

Water effluent from a butane oxidative dehydrogenation plant contains appreciable amounts of oxygenated compounds. Hudson, Jr. et al, U.S. Pat. No. 3,646,239 the disclosure of which is hereby incorporated by reference gives the background for such a dehydrogenation process.

The waste water is obtained from several sources in such a plant. It is generally stripped or flashed for removal of most of the oxygenated compounds which are then either burned or recycled to the dehydrogenation reactor. Hinton et al, U.S. Pat. No. 3,679,764, the disclosure of which is hereby incorporated by reference, illustrates steam stripping with recycle of overhead impurities to the dehydrogenation reactor. It is also possible to strip the waste water with inert gas and then burn the overhead. In any event, the water stream to be treated in accordance with the preferred embodiment of this invention is water from a stripper or flash step that has already had most of the impurities removed. While applicants do not want to be bound by theory, the surprising discovery that it is possible to not only utilize the activated carbon treatment first, but actually to obtain a greatly improved result thereby may be explained by the following. The activated carbon removes the heavier impurities (for which it is best suited) and the biochemical treatment removes the light impurities for which it is best suited. If biochemical treatment is used first, either alone or in front of a carbon adsorber, the heavy impurities retard the activity of the bacteria in the biochemical treatment, insufficient impurities are removed without excessive carbon consumption, and serious reduction in bacteria coagulation results.

The microorganisms for effecting the biochemical treatment can be obtained from any conventional municipal activated sludge treatment plant and conditioned simply by their presence in the effluent to be treated wherein the particular bacteria which thrive on the particular effluent will multiply and the others will die. Generally the effective microorganisms are aerobic gram negative rod shaped bacteria.

The organic materials primarily being treated in accordance with this invention are aldehydes, ketones, acids, and inter-related products thereof.

Any conventional activated carbon can be utilized such as for instance, Nuchar WVG 20 by 40 mesh activated carbon. The carbon can be regenerated in a manner well known in the art. The time and temperature for the activated carbon treatment of the water can be the same as that conventionally employed when activated carbon treatment is used as a tertiary treatment following a biochemical treatment. Generally, the treatment will be carried out at ambient temperature although temperatures within the range of 50° to 150° F are satisfactory. The flow rate can be that which is conventionally utilized and is not critical. For instance a rate of 1 to 10 volumes of water per hour per volume of activated carbon is satisfactory. The most significant factor is the ability to provide a carbon capacity for impurity removal or exposure as measured in pounds of COD per pound of carbon greater than 0.17, preferably greater than 0.4, more preferably in the range of 0.4 to 1.5.

The biochemical treatment can be carried out in the conventional manner as is known in the art. As with the activated carbon adsorption, the biochemical treatment will generally be carried out at ambient temperature although the temperature can vary from 75° to 150° F. Time of treatment from 0.2 to 10 days in hot weather and 0.4 to 20 days in cold weather is preferred although this can vary somewhat.

Referring now to the drawings there is shown an exemplary utility for the instant invention in accordance with the preferred embodiment thereof wherein waste water from an oxidative dehydrogenation process is treated in accordance with the invention. In the oxidative dehydrogenation system, air and steam are passed to furnace 12 by way of process lines 10 and 11, respectively, and are heated to a reaction temperature of about 1050° F. After this the conditionally combined stream is passed by way of line 13 where it is admixed with butene introduced by way of line 14 to reactor 15. The resultant mixture of air, steam and hydrocarbon feed, specifically butene, contacts a suitable dehydrogenation catalyst in zone 15 at a reaction temperature such as from about 800° to 1200° F whereby the butene is converted at least partially to butadiene. The effluent from the dehydrogenation zone additionally contains oxygenated hydrocarbons including carbonyls. The reactant effluent comprising unreacted hydrocarbons, dehydrogenated butene, e.g. butadiene, oxygenated hydrocarbons and water is removed from the reactor by way of line 16 and passes through condenser 17 where the water is substantially condensed to produce an aqueous phase containing a predominance of the oxygenated hydrocarbons contained in the reactor effluent. The condensate is passed to collection vessel 18 wherein the aqueous phase 19 containing oxygenated hydrocarbons is accumulated and the vaporous hydrocarbon phase is removed by way of line 20 and passed to purification and collection facilities. Recycle of the condensate phase 19 containing oxygenated hydrocarbons to the dehydrogenation zone to suppress the formation of additional oxygenated hydrocarbons as well as to conserve water is, of course, desirable for economic reasons.

Aqueous phase 19 containing oxygenated hydrocarbons in zone 18 is removed by line 21 and passed to the top of steam stripper 22. Steam is introduced into the base of stripping zone 22 by way of line 23 and countercurrently contacts water descending in column 22. Column 22 can be provided with suitable packing trays or other contact media effective for vapor-liquid contacting. The steam rising through stripping zone 22 removes a major portion of the oxygenated hydrocarbons present in the water phase introduced into the upper portion of the column. Steam and the oxygenated hydrocarbons stripped from the water phase are removed overhead from zone 22 by way of line 24 and returned to furnace 12 by introduction into steam line 11. The water phase essentially stripped of oxygenated hydrocarbons is removed as bottoms from column 22 by way of line 25 and passed to kettle accumulator 26. A portion of the liquid accumulated in kettle 26 is removed and passed to the activated carbon treatment step of this invention via line 27 and the remainder is removed by way of line 28, passed through pump 29 and through reboiler heater 30 to elevate the temperature to form steam for introduction into column 22 through line 23. The amount of stripping with steam is preferably controlled so that the amount of water equivalent to the process demand rate is vaporized and returned to furnace 12 by way of lines 24 and 11. Reboiler 30 can be heated by way of an external source of steam introduced by way of line 31, the flow rate of which can be controlled by temperature controller sensing the temperature in the upper portion of column 22. The rate of removal of steam plus oxygenated hydrocarbons in line 24 can be controlled by a flow rate controller set to pass a certain flow rate based on the flow rate in line 11 so that a combined stream meeting the process demand rate is provided. The steam-stripped water phase removed from the base of column 22 can be neutralized by the addition of a base so as to heat water in reboiler 30 which is substantially neutral. A base is introduced into line 25 by way of line 32. The addition of base through line 32 can be controlled by a pH meter 33 which senses the pH of water removed from accumulator 26 and adjusts the valve controlling the flow rate of base introduced. Effluent from accumulator 26 flows via line 27 to activated carbon treatment bed 34.

As set out hereinabove a portion of the liquid accumulated in kettle 26 is removed as waste water and passed to activated carbon bed 34 via line 27.

Treated effluent from activated carbon adsorption bed 34 passes to effluent retention zone 36 via lines 38 and 40. Periodically, water from 36 is passed via lines 40 and 38 (the normal flow being discontinued at this time) to backwash the activated carbon beds with the backwash water then flowing via line 46 to backwash effluent zone 48. Effluent from backwash zone 48 is discharged via line 50. During normal operation, the treated effluent from activated carbon beds 34 is removed from effluent retention zone 36 and passed via line 52 to a conventional activated sludge biotreating unit designated generally by reference character 54. Specifically, effluent from line 52 is passed into activated sludge tank 56 for a conventional detention time of from a few hours to a few days. Effluent from tank 56 is passed to a clarifier tank. A portion of the effluent from the clarifier tank can be passed via line 62 back to tank 56; this material is primarily bacteria. Air to provide oxygen is introduced into the activated sludge tank 56 via line 60. Mixing of the air with the activated sludge is effected by stirrer 63. The thus purified water is removed via line 64. The following four-part example demonstrates the surprising ability to achieve acceptable effluent with a commercially feasible utilization of activated carbon by first treating waste water with an activated carbon bed and thereafter subjecting same to biotreatment.

EXAMPLE

I. Test of Carbon Adsorption Alone

Waste from an operating butene dehydrogenation plant was passed through activated carbon to determine if this method could be used alone to purify the water. Four beds of activated carbon were used, each being 6 feet in length and 6 inches in diameter. Each bed contained 25 pounds of 12 × 40 mesh activated carbon. The waste water was passed through the 4 beds in series at a rate of 97.27 liters per hour. The following data were taken:

TABLE I

Carbon Treatment of Waste Water

| Time from Start of Test, hours | C.O.D., mg/l | | | | |
|---|---|---|---|---|---|
| | Feed | No. 1 Bed Effluent | No. 2 Eff. | No. 3 Eff. | No. 4 Eff. |
| 7.8 | 2420 | 1110 | 650 | 550 | 550 |
| 15.8 | 2280 | 1570 | 1150 | 1000 | 650 |
| 23.8 | 2080 | 1750 | 1360 | 1170 | 1080 |
| 31.8 | 2200 | 1640 | 1500 | 1150 | 1070 |
| 39.8 | 2200 | 1780 | 1760 | 1460 | 1230 |
| 47.8 | 2280 | 1820 | 1980 | 1990 | — |
| 55.8 | 2200 | 1650 | 1500 | 1570 | 1390 |
| 63.8 | 2280 | 1800 | 1690 | 1620 | 1640 |
| 71.8 | 2330 | 1850 | 1740 | 1740 | 1730 |

At the end of the test a total of 0.34 lb. COD had been passed or "exposed" to each pound of carbon; this is conventionally expressed as a carbon exposure of 0.34 lb. COD per pound of carbon.

Observation of the data in Table I indicates that carbon treatment alone cannot reduce the COD of the water used in the test below about 550 mg/liter as evidenced by the initial effluents from beds No. 3 and 4. Since a maximum COD of 200 mg/liter is required, carbon treatment alone is insufficient.

II. Test of Biochemical Treatment Alone

A pilot-plant biochemical treater was operated for extended periods of time to test the purification of waste water from a commercial butene oxidative dehydrogenation. The biotreater comprised a 5-foot-diameter by 7-foot-high stainless steel tank operated with a liquid volume of 780 gallons. The tank was jacketed with water for controlling the contents at a temperature of 80° F. Air was continuously introduced into the tank contents through three pipes at a location just below a mixer. The latter provided gentle agitation of the tank contents. Discharge liquid was taken from the bottom of the tank to an adjoining clarifier consisting of a 20-inch-diameter, 7-foot-tall vertical pipe with a cone-shaped bottom. Feed from the biotreater entered the clarifier at a level about 1/5 the distance from the bottom. Solids settled to the bottom and were recycled to the treater with a pump. Clear, purified water overflowed from the top of the clarifier at the same rate raw feedwater was added to the biotreater, about 10 to 20 gallons per hour.

Nutrients were added to the feedwater before same was passed to the bio-treater as in conventional biotreating operations. This consisted of 5 parts nitrogen in the form of anhydrous ammonia and 1 part phosphorus in the form of phosphoric acid per 100 parts by weight of COD in the water.

Bacteria were obtained from a commercial biotreater operating in an oil refinery. Samples of the recycle sludge were used. The bacteria were considered to be a mixed population, i.e., a mixture of strains as used in commercial biotreaters. The sludge used as bacteria source had an MLVSS count of 6000 (MLVSS = mixed liquor volatile suspended solids — this is a measure of bacteria concentration).

Alum was added to assist in the settling of the bacterial sludge to the bottom of the clarifier. Operation was unstable without alum addition, i.e., a high percentage of the bacteria failed to settle in the clarifier and were lost in the clarifier overflow. This was normally the case when waste water was biotreated without preliminary treatment.

The following data are representative of those taken during extended operation of the biotreater.

TABLE II

| Operation of Biotreater Pilot Plant | |
|---|---|
| Length of Test, days | 46 |
| Feed Rate, gal/hr | 17 |
| Residence Time of Water in Biotreater, days | 2.1 |
| Feedwater Composition | |
| COD, mg/liter | 2000 |
| BOD, mg/liter | 1200 |
| Clarifier Effluent Composition | |
| COD, mg/liter | 550 |
| BOD, mg/liter | 175 |
| Volatile Suspended Solids | |
| (1) Clarifier Effluent, TSS,* mg/liter | 75 |
| (2) Biotreater Liquor, MLVSS, mg/liter | 3200 |
| Aluminum sulfate as aluminum, ppm | 55 |

*Total suspended solids

It is seen that the clarifier effluent COD of 550 mg/liter exceeded the specification value of 200 mg/liter and that the BOD value of 175 mg/liter also exceeded the specification value of 20 mg/liter. The above data were the best obtained. An extended investigation of operating variables did not improve the performance of the biotreater well enough to meet COD specifications. It was concluded that biotreating could not be used by itself to purify the waste water from a butene oxidative dehydrogenation plant.

III. Tests of Biochemical Treatment followed by Adsorption

The biochemical treatment described under II was operated without alum coagulant to prepare partially purified water for final purification by carbon adsorption. Operation of the biotreater was unstable without alum addition, i.e., bacteria were being lost in the clarifier overflow and thus if bacteria losses were greater than bacteria production the operation could not have been continued indefinitely. During a short period of operation, however, water was prepared with lower COD and BOD contents than prepared under II as the following data illustrate.

TABLE III

| | |
|---|---|
| Retention Time | 2.1 days |
| Feedwater Composition, | |
| COD, mg/liter | 2240 |
| BOD, mg/liter | 1170 |
| Clarifier Effluent | |
| COD, mg/liter | 370 |
| BOD, mg/liter | 50 |
| Volatile Suspended Solids, | |
| (1) Clarifier Effluent | |
| TSS, mg/liter | 320 |
| (2) Biochemical Treatment Liquor | |
| MLVSS, mg/liter | 2100 and decreasing |

It is observed that the solids in the clarifier effluent were high, 320 mg/liter. This means that considerable bacteria were lost from the biochemical treatment system. As a further indication of this loss, (bacteria in the effluent) the clarifier effluent after storage in drums for about 2 weeks showed a decrease in both COD and BOD levels, as indicated below in Table IV, because of continued bacterial action.

Water as partially purified above was then passed in series through four beds of activated carbon, each bed contained in a pipe 0.622 inches in diameter and 6 feet tall and filled with 152 grams of 12 × 40 mesh carbon. Water rate was 3.0 liters per hour. The following data were taken:

TABLE IV

| Time from Start of Test, hours | Feed Composition, COD, mg/l | Effluent from Carbon Beds | | | | | | | |
|---|---|---|---|---|---|---|---|---|---|
| | | No. 1 | | No. 2 | | No. 3 | | No. 4 | |
| | | COD | Exp* | COD | Exp | COD | Exp | COD | Exp |
| 19 | 180 | 0 | 0.066 | 0 | 0.033 | 0 | 0.022 | 0 | 0.016 |
| 31 | 180 | 32 | 0.107 | 0 | 0.053 | 0 | 0.036 | 0 | 0.027 |
| 43 | 180 | 40 | 0.149 | 0 | 0.074 | 0 | 0.050 | 0 | 0.037 |
| 55 | 202 | 80 | 0.192 | 0 | 0.096 | 0 | 0.064 | 0 | 0.048 |
| 85 | 202 | 96 | 0.310 | 48 | 0.155 | 24 | 0.103 | 0 | 0.077 |
| 101.5 | 202 | 112 | 0.375 | 64 | 0.188 | 32 | 0.125 | 16 | 0.094 |

*lb. of COD fed to bed per lb. carbon
The above data indicate that the combination of biochemical treating followed by carbon adsorption will indeed produce specification water, will in fact produce water with 0 content of COD but at a prohibitively high usage of carbon. A comparison of carbon usage for the combination of biotreating followed by adsorption with the reverse combination will be made after presentation of data for the latter scheme. Further, the high concentration of solids in the biotreater effluent results in frequent process interruptions to permit carbon bed back-flushings.

IV. Tests of Adsorption Followed by Biochemical Treating

Waste water from a butene oxidative dehydrogenation plant was first passed through carbon adsorbers as described under I and the effluent therefrom then passed through the biochemical treatment as described under II. The following data are representative of those taken.

TABLE V

| | Adsorption Followed by Biotreating | | |
|---|---|---|---|
| Test No.: | 1 | 2 | 3 |
| Waste Water COD, mg/liter: Composite Water(1) | 2000 | 2100 | 2200 |
| Effluent from Adsorbers, mg/liter | 1000 | 1600 | 1750 |
| Carbon Exposure lb. COD/lb. Carbon: | 0.4 | 1.5 | 2.4 |
| Biotreater MLVSS(2): | 3000 | 3000 | 3100 |
| Residence Time in Biotreater, days: | 1.9 | 1.9 | 1.9 |
| treater Effluent: | | | |
| COD, mg/liter | 35 | 30 | 105 |
| BOD, mg/liter | 15 | 20 | 65 |
| TSS, mg/liter | 55 | 60 | 120 |

(1)COD of blend of total effluent from last adsorber
(2)Mixed liquor volatile suspended solids The above data indicate that specification water can be produced with a carbon exposure as high as 1.5 lb. COD per lb. of carbon. In contrast the combination of biotreating followed by carbon adsorption required a carbon exposure of no more than about 0.17 lb. COD per lb. of carbon (this figure is obtained from the data in Table IV, effluent from Bed No. 1 is cut off when COD of the effluent reaches 60 with a carbon exposure of about 0.17 — the composite COD of this water will thus be (0 + 60)/2 = 30 which equals that obtained from Test 2 in Table V. Thus it would be necessary to use 1.5/0.17 = 9 times as much carbon for the combination of biotreating followed by adsorption as vice versa. Or alternatively, using the same amount of carbon, it would be necessary to regenerate 9 times as often for the biotreating-adsorption combination.

Another important advantage for the adsorption-biotreating combination is that the biochemical treatment operated stably (no significant loss of bacteria) without the addition of alum. When biochemical treatment is used without preliminary treatment by adsorption, the biotreater would not normally operate stably without the addition of alum. Some alum, of course, is discharged into the purified water and constitutes a pollution problem of its own.

What is claimed is:

1. A process comprising: contacting waste water having a COD of greater than 1000 milligrams/liter, over 50 percent of the material creating said COD being soluble in said water, with activated carbon; thereafter subjecting said thus treated water to a biochemical treatment to further reduce said COD.

2. A method according to claim 1 wherein said biochemical treatment is an activated sludge process.

3. A method according to claim 1 wherein said contact with said activated carbon is done under conditions so as to give a carbon exposure of greater than 0.17 pounds COD per pound of carbon.

4. A method according to claim 1 wherein said contact with said activated carbon is done under conditions so as to give a carbon exposure within the range of 0.4 to 1.5 pounds COD per pound of carbon.

5. A method according to claim 1 wherein said COD is reduced to less than 200 milligrams/liter.

6. A method according to claim 5 wherein the BOD is reduced to less than 20 milligrams/liter.

7. A method according to claim 1 wherein said waste water is the effluent from an oxidative dehydrogenation process.

8. A method according to claim 7 wherein said effluent is steam stripped prior to contacting with said activated carbon.

9. A method according to claim 1 wherein said biochemical treatment involves the use of aerobic gram negative bacteria.

10. A method according to claim 1 wherein said biochemical treatment is an activated sludge process, said waste water is effluent from an oxidative dehydrogenation process, and wherein no material is added to assist in settling of bacterial sludge.

11. A method according to claim 1 wherein said biochemical treatment is an activated sludge process, said waste water is effluent from an oxidative dehydrogenation process, and no alum is added.

* * * * *